(No Model.) 3 Sheets—Sheet 1.

D. H. KEELEY & A. A. E. GARVEY.
QUADRUPLEX AND DUPLEX TELEGRAPH.

No. 331,975. Patented Dec. 8, 1885.

WITNESSES
Wm. A. Skinkle
Henry A. Lamb

INVENTORS
David H. Keeley
Aaron A. E. Garvey
By their Attorney (No Model.) 3 Sheets—Sheet 2.

D. H. KEELEY & A. A. E. GARVEY.
QUADRUPLEX AND DUPLEX TELEGRAPH.

No. 331,975. Patented Dec. 8, 1885.

WITNESSES

INVENTORS (No Model.) 3 Sheets—Sheet 3.
D. H. KEELEY & A. A. E. GARVEY.
QUADRUPLEX AND DUPLEX TELEGRAPH.

No. 331,975. Patented Dec. 8, 1885.

WITNESSES
Wm A. Skinkle
Henry A. Lamb

INVENTORS
David H. Keeley
Aaron A. E. Garvey
By their Attorney

UNITED STATES PATENT OFFICE.

DAVID HERBERT KEELEY, OF OTTAWA, ONTARIO, AND AARON A. E. GARVEY, OF MONTREAL, QUEBEC, CANADA.

QUADRUPLEX AND DUPLEX TELEGRAPH.

SPECIFICATION forming part of Letters Patent No. 331,975, dated December 8, 1885.

Application filed November 14, 1883. Serial No. 111,761. (No model.)

*To all whom it may concern:*

Be it known that we, DAVID HERBERT KEELEY, of the city of Ottawa, in the county of Carleton, in the Province of Ontario, telegrapher, and AARON ALBERT EDWARD GARVEY, of the city of Montreal, in the county of Hochelaga, in the Province of Quebec, Canada, telegrapher, have invented certain new and useful Improvements in Multiple Telegraphy; and we do hereby declare that the following is a full, clear, and exact description of the same.

The first part of our invention consists in the combination, with a main-line telegraph-circuit, of a local circuit embracing a transmitting-battery, and appliances whereby the battery may be instantly transferred from one circuit to the other, and so connecting a receiver therewith that it is uniformly influenced by the battery, whether that battery be in one circuit or the other, and in the employment of an inductor of the form and with the connections described, for the purpose of neutralizing the effect of extra and return currents in the main-line circuit on the introduction and withdrawal of the transmitting-battery, the object of this arrangement being to provide a new and suitable means of simultaneous transmission in opposite directions, wherewith to combine the second part of our invention.

The second part of our invention consists in a new arrangement of transmitters and receivers, whereby double transmission in the same direction is rendered easy and practicable with currents of much lower tension than can be employed in the operation of any other system of this kind.

The combination of these parts comprises a system whereby two sets of signals may be rapidly and accurately transmitted simultaneously from both ends of a telegraph-line.

Figure 1:
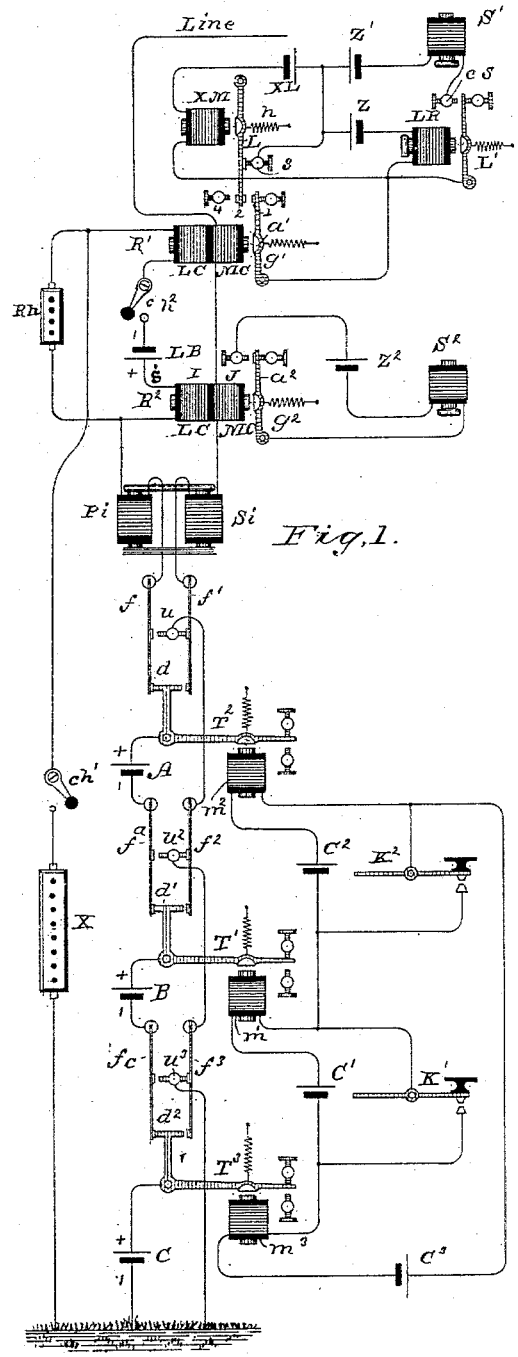
Figure 2:
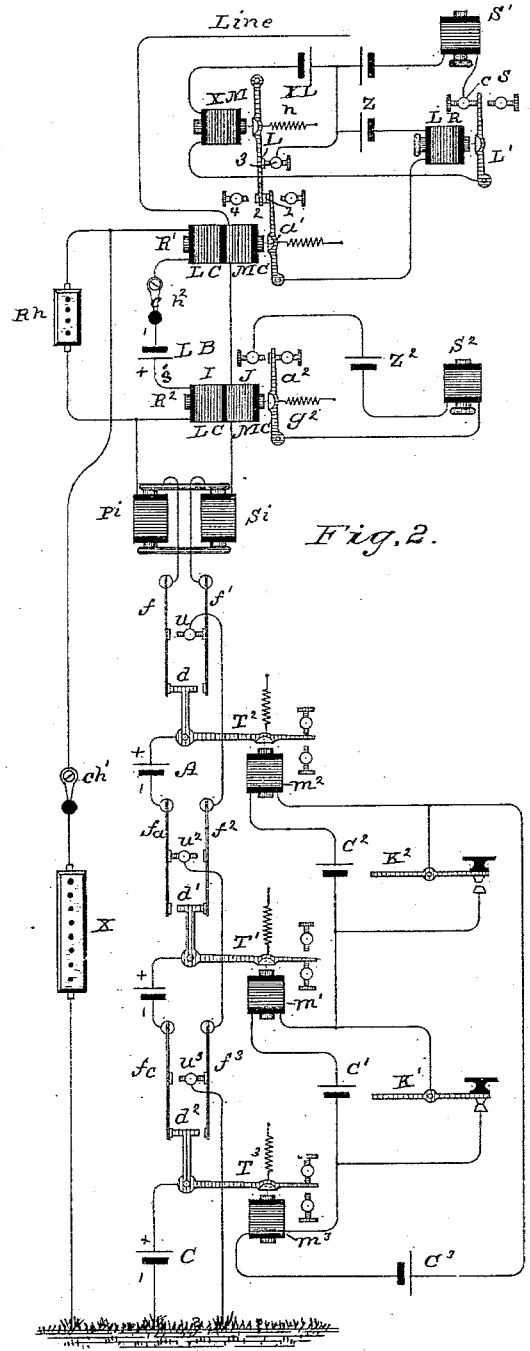
Figure 3:
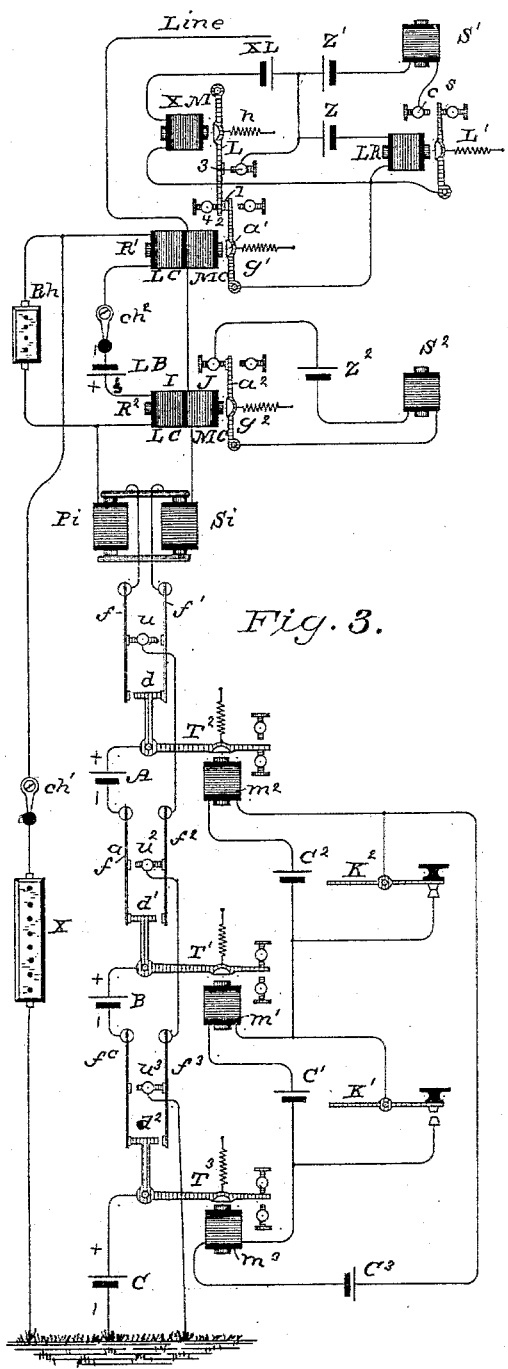
Figure 4:
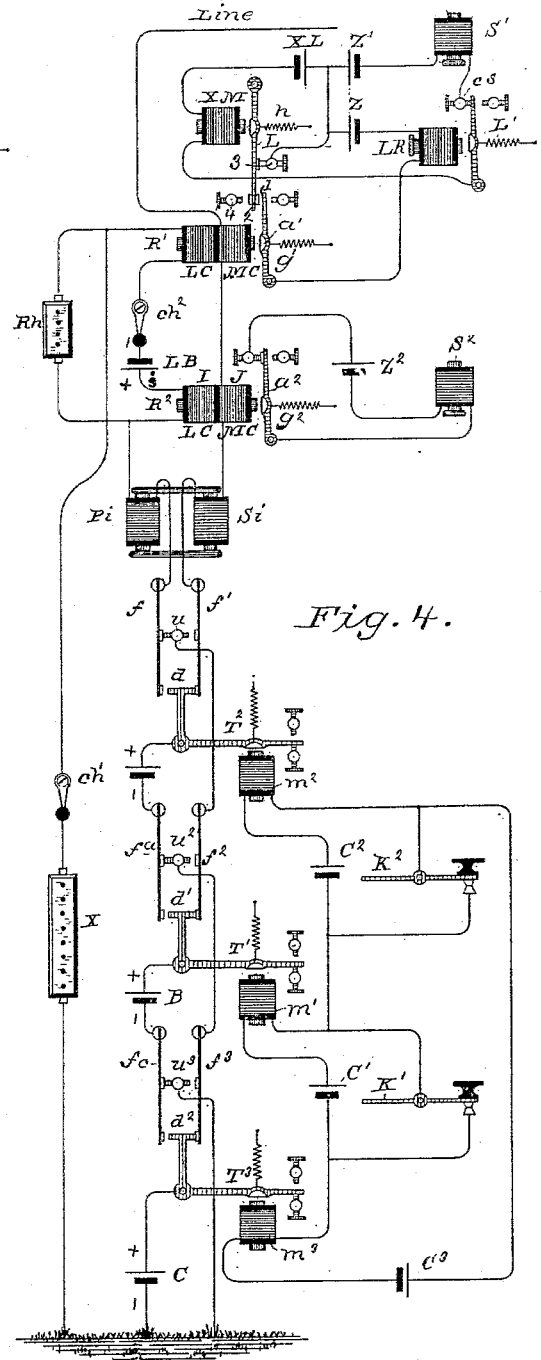
Figure 5:
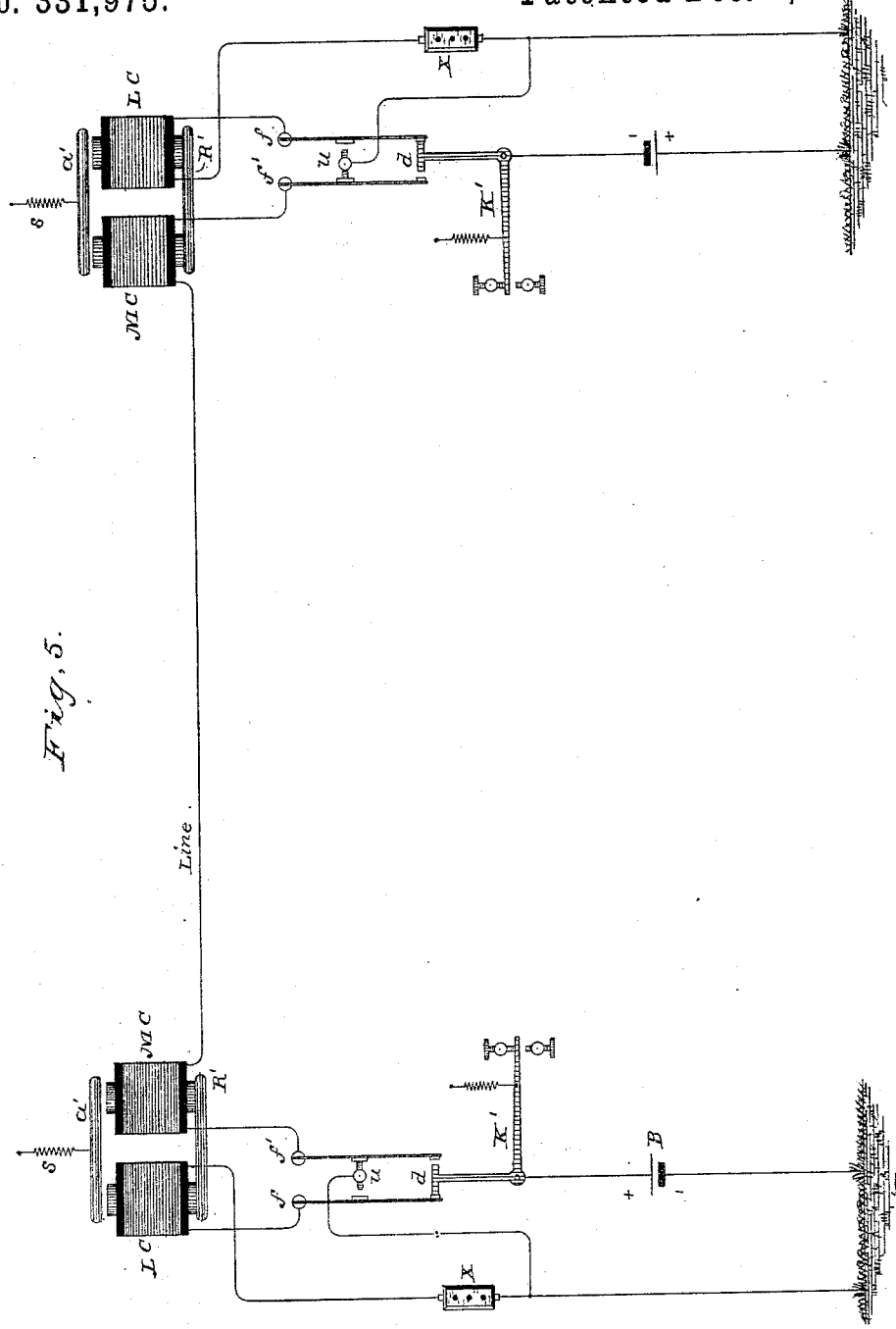

Figure 1 shows our invention with both keys open at the transmitting-station. Fig. 2 shows it with key K' closed and key K² open. Fig. 3 shows it with key K² closed and key K' open. Fig. 4 shows it with both keys K' and K² closed. Fig. 5 shows our improvement applied to a duplex system.

As the operation of our invention can be more readily explained without immediate reference being made to the first and second parts thereof, we will deal first with the combination of the whole. (Represented in Fig. 1.)

In Fig. 1, R' R² are the receiving-relays. R' is an electro-magnet wound with four wires, two upon each half of the core. Two of these wires or coils (one upon each half of the core) are connected together to form a pair of coils, L C. The other two wires or coils (one upon each half of the core) are connected to form another pair of coils, M C. These wires or coils may be superposed one upon the other, or may occupy separate spaces upon the core. For convenience of illustration the latter method is represented in the figure, in which only one-half of the electro-magnet is visible.

R² is an electro-magnet of similar construction to R'.

K' K² are Morse keys controlling three electro-magnets, M' M² M³, operated by the batteries C' C² C³, by which is effected the depression and upraisal of the pivoted levers of three six-point transmitters, T' T² T³, whose depression and upraisal reverses the position of the flat springs or hinged levers $f\ f'\ f^a\ f^2\ f^c\ f^3$, with respect to the contacts $u'\ u^2\ u^3$ and the contacts upon the ends of the lever-arms $d\ d'\ d^2$.

Pi is the primary coil of an inductor, of which Si is the secondary coil.

A B C are sections of the transmitting-battery controlled by the transmitters T' T² T³.

L B is a small battery employed to neutralize, when so required, the local effect of the transmitting-battery A B C, which is constantly traversing the receiving-relays R' R² in one direction, either through the coils M C in the main circuit or through the coils L C in the local circuit, or both, according to the position of the transmitters T' T² T³, as hereinafter explained.

R*h* is an adjustable resistance regulating the effect of the battery L B, and of the transmitting-battery A B C with respect to the relays R' R².

X is a rheostat employed to vary the resistance of the local circuit (hereinafter indicated) to suit the conditions of the main-line circuit, and to secure, in conjunction with the adjustable shunt R*h*, a uniform effect from the transmitting-battery A B C in the receiving-relays R' R² during the operation of the keys K' K².

In the normal condition of the apparatus, with the keys K' K² open, and as represented in the figure, the batteries C' C² are opposed by battery C³, and the current traversing the electro-magnets M' M² M³ is not sufficient to affect them. The main circuit is traced from earth via $u^3 f^3 u^2 f^2 u' f'$, coil S$i$, and coils M C to line. There is therefore no battery in the main circuit. The local circuit is traced from earth through C $d^2 f^c$ B $d' f^a$ A $d f$, coil P$i$, shunt R$h$ to switch C$h'$, where it is interrupted. The whole of the battery A B C is therefore in the local circuit, but its flow is interrupted at the switch C$h'$. The circuit of the battery L B is interrupted at the switch C$h^2$. There is therefore no current flowing through the relay-coils L C M C.

As the object of the arrangement represented in the figure is to admit of signals being transmitted independently by the keys K' K² to the distant end of the line simultaneously with the receipt of two independent sets of signals by the relays R' R² from the distant end of the line, it is first requisite that the relays R' R² be rendered insensible to the operation of the keys K' K². This is accomplished in the following manner: K² is closed. Battery C² flows through and closes electro-magnet M², thereby causing T² to reverse the positions of the flat springs $f f'$ with respect to the contacts $u'$ and $d$. Battery C' is opposed by C³ and electro-magnets M' M³ remain unaffected. The main circuit is now traced from earth through C $d^2 f^c$ B $d' f^a$ A $d f'$, coil S$i$, coils M C to line. The whole of the transmitting-battery A B C is therefore in the main circuit through the coils M C of the relays R' R², and the armatures A' A² are thereby attracted. The switch C$h^2$ is now closed and the resistance of the shunt R$h$ adjusted till the battery L B, acting in the coils L C, neutralizes the transmitting-battery A B C, acting in the coils M C. Relays R' R² have now no attraction for the armatures A' A². K² is now opened again. Magnet M² releases T², and the flat springs $f f'$ are thereby restored to their first position with respect to the contacts $u'$ and $d$. The transmitting-battery A B C is therefore withdrawn from the main circuit and reintroduced into the local circuit, which is still interrupted at the switch C$h'$. The battery L B now acts alone upon the relays R' R² through the coils L C, and the armatures A' A² are again attracted. The switch C$h'$ is now closed, thus completing the local circuit, and the resistance X is adjusted till the proportion of the transmitting-battery A B C, flowing through the coils L C, neutralizes the power of the battery L B acting in these coils. The relay-magnets R' R² therefore again lose their attraction for the armatures A' A². Hence with K² closed the transmitting-battery A B C, acting in the coils M C, is neutralized by the battery L B acting in the coils L C, and with K² open the battery L B, acting in the coils L C, is neutralized by the battery A B C, also acting in the coils L C.

Therefore the transmitting-battery A B C, whether acting in the coils M C in the main circuit or in the coils L C in the local circuit, is neutralized by the battery L B. A balance now being effected, the key K² can, if the line is a short one, be operated without affecting the relays R' R²; but if the line is a long one the effects of the "extra" and "return" currents, which arise momentarily upon the battery being introduced into and withdrawn from the main circuit, will, unless neutralized, be apparent in the relays R' R². Our method of neutralizing these currents (to effect which recourse has heretofore been had to condensers and artificial line-circuits) is explained hereunder. As the battery L B is one of very low power, the resistance of the shunt R$h$ must be made very low to render the battery L B sufficiently effective to neutralize the transmitting-battery A B C acting in the coils M C. Consequently when the battery A B C is transferred from the main circuit to the local circuit the proportion of the battery A B C passing via the shunt R$h$ is much greater than that passing through the coils L C; whereas to obtain the requisite condition the portion passing through L C must equal the power of the battery L B, (which is equal to that exercised in the coils M C by the transmitting-battery A B C, when in the main circuit.) In order therefore to render the proportion of the transmitting-battery A B C passing through the coils L C equal to the power of the battery L B, the power of the transmitting-battery A B C, when acting in the local circuit, must be augmented. This is done by lessening the resistance X till the power of the transmitting-battery A B C is so greatly augmented that the proportion passing through the coils L C equals the power of the battery L B. The transmitting-battery A B C is then comparatively short-circuited, and in consequence powerfully affects the inductor primary P$i$, through which it flows. By varying the power of the battery L B therefore (which may be done by introducing a rheostat at the point $i$, or by altering the number of cells in the battery) the effect of the transmitting-battery A B C on the inductor-primary P$i$ may be regulated to any extent and the extra and return currents neutralized by the inductor secondary coil S$i$, the operation being as follows: When the key K² is closed, and the transmitting-battery A B C thereby transferred from the local to the main circuit, a + current flows from the battery A B C into the line. At the instant the key K² is opened and the battery A B C withdrawn from the main circuit a + current returns from the line. At the same instant, however, the battery A B C (having been reintroduced to the local circuit) flows through the primary coil P$i$, and the secondary coil S$i$, by induction, gives out a + current to meet that coming from the line. Thus the return current, which is only momentary, is neutralized. While the key K² is open the transmitting battery A B C flows through the primary coil P$i$ in the local circuit. At the instant the key K$^2$ is depressed the current is removed from the primary coil P$i$, and the secondary coil S$i$, by induction, now gives out a — current at the same time that the battery A B C flows again with a + current into the main circuit. This — wave of the secondary coil S$i$ weakens the + current of the transmitting-battery A B C, and thus neutralizes the statical current, which arises for an instant upon the charging of the line.

The inductor which we employ in the manner just explained may be of any description— that is, of any form wherein the principle of the induction-coil is embodied—viz., the introduction and withdrawal or increase and decrease of a current in one wire, called the "primary," will induce currents in another wire, called the "secondary."

It has been shown above that the transmitting-battery A B C, when in the local circuit, though split between the shunt R$h$ and the coils L C, is made to exercise an effect equal to that of the battery L B in the coils L C; hence—

*Effective Current of Transmitting-Battery.*

|  | In main circuit through coils M C. | In local circuit through coils L C. | Total in R' R$^2$. |
| --- | --- | --- | --- |
| With both keys open.. | 0 | A B C | = A B C |
| K$^2$ closed | A B C | 0 | = A B C |

A uniform effect is therefore exercised by the transmitting-battery A B C upon the relays R' R$^2$, whether it be in the local circuit or in the main circuit; and as this uniform effect is uniformly neutralized by the battery L B the key K$^2$ may now be operated upon to transmit the current of the battery A B C into the main circuit without affecting the armatures A' A$^2$, which are free to respond to any magnetic effect imparted to the relays R' R$^2$ by currents transmitted from the distant end of the line. With the key K' closed and K$^2$ open C' closes M', causing the transmitter-lever T' to reverse the flat springs $f^a f^2$ with respect to the contacts $u^2$ and $d'$. The battery C$^2$ is opposed by battery C$^3$ and electro-magnets M$^2$ M$^3$ remain unaffected. The main circuit is now traced from earth through C $d^2 f^c$ B $d' f^2 u' f'$, coil S$i$, coils M C to line. The sections B C of the transmitting-battery are therefore in the main circuit. The local circuit is traced from earth via $u^3 f^3 u^2 f^a$ A $d f$, coil P$i$, shunt and coils R$h$ L C, resistance X to earth. The section A of the transmitting-battery is therefore in the local circuit; hence—

*Effective Current of Transmitting-Battery.*

|  | In main circuit through coils M C. | In local circuit through coils L C. | Total in R' R$^2$. |
| --- | --- | --- | --- |
| With K' closed | B C | A | = A B C |

The uniform effect is still maintained in the relays R' R$^2$, as was the case with key K$^2$ closed. With both keys closed the battery C' actuates the electro-magnet M', causing the transmitter-lever T' to reverse the positions of the flat springs $f^a f^2$ with respect to the contacts $u^2$ and $d'$; C$^2$ actuates M$^2$, causing T$^2$ to reverse the positions of the flat springs $f f'$ with respect to the contacts $u'$ and $d$, and C$^3$ (as there is no current now opposing it) actuates M$^3$, causing T$^3$ to reverse the positions of the flat springs $f^c f^3$ with respect to the contacts $u^3$ and $d^2$. The main circuit is now traced from earth through C via $d^2 f^3 u^2 f^a$ A $d f'$, coil S$i$, coils M C to line. The sections A C of the transmitting-battery are therefore in the main circuit. The local circuit is traced from earth via $u^3 f^c$ B $d' f^2 u' f$, coil P$i$, shunt and coils R$h$, L C, resistance X to earth. The section B of the transmitting-battery is therefore in the local circuit; hence—

*Effective Current of Transmitting-Battery.*

|  | In main circuit through coils M C. | In local circuit through coils L C. | Total in R' R$^2$. |
| --- | --- | --- | --- |
| With both keys closed. | A C | B | = A B C |

The uniform effect is therefore maintained in the relays R' R$^2$ throughout the operation of the keys, and, as has been shown by the results above, the operation of the keys produces in the main and local circuits three variations of current strength under the following conditions, viz: When A is greater than B, and C is equal to or less than B, let A = 12, B = 4, and C = 4. Then we produce:

*Effective Current of Transmitting-Battery.*

|  | In main circuit through coils M C. | In local circuit through coils L C. | Total in R' R$^2$. |
| --- | --- | --- | --- |
| Both keys open | 0 | (12+4+4=)20 | =20 |
| K' closed | (4+4=) 8 | 12 | =20 |
| K$^2$ closed | (12+4+4=)20 | 0 | =20 |
| Both keys closed | (12+4=)16 | 4 | =20 |

Or when C is greater than A and B is less than A, let C = 12, A = 8, and B = 4. Then we produce:

*Effective Current of Transmitting-Battery.*

|  | In main circuit through coils M C. | In local circuit through coils L C. | Total in R' R$^2$. |
| --- | --- | --- | --- |
| Both keys open | 0 | (8+4+12=)24 | =24 |
| K' closed | (4+12=)16 | 8 | =24 |
| K$^2$ closed | (8+4+12=)24 | 0 | =24 |
| Both keys closed | (8+12=)20 | 4 | =24 |

So long as the specific values of the sections A B C of the transmitting-battery in respect to each other, as explained above, are maintained, it matters not what number of cells is employed in the different sections, the result will always be the same, viz: with both keys open, no current to line; K' closed, minimum current to line; K$^2$ closed, maximum current to line; both keys closed, intermediate current to line. And as the sum of the effective currents of the transmitting-battery A B C flowing through the coils L C and M C is the same under all conditions of the keys, and the sum of these currents is uniformly neutralized by the battery L B, the keys $K'$ $K^2$ may be manipulated without in any way affecting the relays $R'$ $R^2$.

The apparatus and arrangements being exactly similar at both ends of the line, our method of receiving the signals transmitted from the distant end of the line will be readily understood by the following:

$S^2$ is a sounder or register operated by a battery, $Z^2$, and the armature-lever $A^2$ of relay $R^2$, in the usual manner. Normally the retractile spring $g^2$ holds the armature-lever $A^2$ away from the relay-magnet $R^2$, and its tension is such that the magnetic effect imparted to $R^2$ by the minimum transmitted current is insufficient to attract the armature $A^2$. When the intermediate or the maximum currents traverse the relay-magnet, however, the magnetic attraction for $A^2$ is greater than the tension of the spring $g^2$. The armature-lever $A^2$ consequently responds to these currents, and, passing over to the contact-point J, completes the circuit of the battery $Z^2$ and actuates the sounder $S^2$. The sounder $S^2$ therefore responds to the motions of the key $K^2$, as it is only when $K^2$ is depressed that the intermediate or the maximum currents are transmitted.

$S'$ is a sounder or register operated by a battery, $Z'$, the circuit of which is normally interrupted at the contacts $Sc$.

L R is a local relay operated by a battery, Z, which is normally opposed and neutralized by a battery, X L.

X M is an electro-magnet mounted upon the frame-work of the relay $R'$ in such a manner that its armature-lever L is interposed between the armature-lever $A'$ and the front stop, 4, against which that lever would otherwise rest when attracted: X M is actuated by the battery X L, which is normally neutralized by battery Z. When there is no attraction in the relay-magnet $R'$, the retractile spring $g'$ holds the armature $A'$ away from the relay-magnet; but its tension is so low that the magnetic effect of the minimum transmitted current can control the armature.

The operation of this combination is as follows: When the current of minimum power traverses the relay $R'$, the armature $A'$ is attracted, and the lever $A'$ accordingly passes over against the contact 2 on the lever L. The tension of a retractile spring, $h$, prevents its carrying the lever L off from the point 3, (against which the lever L normally rests.) The battery X L has then a circuit via contacts 3, lever L, contacts 2 1, lever $A'$ through the electro-magnet X M; but the combined attraction of the relay-magnet $R'$ and the electro-magnet X M is not sufficient to overcome the tension of the retractile spring $h$. The battery Z therefores completes its circuit via 3 L 2 1 $A'$, through the local relay L R, which accordingly attracts armature $L'$, and contact is made at $Sc$. The battery $Z'$ now has a complete circuit via 3 L 2 1 $A'$ $Sc$ ($L'$) through the sounder-magnet $S'$. The sounder $S'$ consequently responds to the minimum transmitted current. As the circuit of $Z'$ is not completed till the local relay closes the contacts $Sc$, and as after this closing is effected at $Sc$ the circuit depends upon the contacts 3 L 2 1 the circuit of $Z'$ will be interrupted at the instant any of these contacts are broken. When the current of maximum power traverses the relay $R'$, the combined attraction of $R'$ and the local magnet X M is greater than the tension of the spring $h$, and the lever L is accordingly forced from the point 3. At the instant the lever L leaves the point 3, however, the circuit of the battery X L is broken and the electro-magnet X M loses its attractive force and (the tension of the retractile spring $h$ being greater than the attractive force of the relay-magnet $R'$ alone) the lever L returns to the point 3, when the electro-magnet X M is again actuated and the operation is repeated indefinitely. Thus L continues to vibrate during the time the maximum current traverses the relay-magnet $R'$, and, as during this vibration the contacts 3 L 2 1 and $Sc$ cannot be simultaneously made, the circuit of $Z'$ continues interrupted and the sounder $S'$ remains unaffected. When the intermediate current is put to line, the vibration of the lever L ceases or does not obtain, (as then the tension of the spring $h$ is greater than the combined attraction of the relay-magnet $R'$ and the electro-magnet X M,) the contacts are made at 3 L 2 1 and $Sc$, the circuit of the battery $Z'$ is thereby completed and the sounder $S'$ responds. Thus $S'$ responds to the motions of the key $K'$, as it is only when $K'$ is depressed that the minimum or the intermediate currents are transmitted.

As the receiving-relay $R'$, arranged as above described, is susceptible of easy adjustment on small margins of working current, our method of quadruplex telegraph, explained above, can be operated with currents of very low tension.

Fig. 5 represents a modification of the duplex part of our invention. $R'$ is an ordinary Morse relay, the coils upon each half of the core being connected separately with the flat springs $f f'$ of the transmitter. $K'$ is the pivoted lever of an ordinary six-point transmitter. Its depression and upraisal causes the flat springs $f f'$ to reverse their positions with respect to the contacts $u$ and the contacts upon the end of the arm $d$. It is preferably operated by means of an electro-magnet, battery, and key, in the usual manner, which are omitted in the figure as unnecessary to this specification. In the normal position the main circuit is completed through the right-hand coil M C of the relay $R'$ via $f'$ $u$ to earth; and the battery B operates in the local circuit, its course being $+$ via $d$ $f$ through the left-hand coil L C of the relay $R'$ and resistance-coils X to $-$. The armature $A'$ is therefore attracted by the magnetism imparted to the relay R' by the transmitting-battery B acting in the coil L C. When the pivoted lever K' is depressed, the main circuit is completed through the coil M C via f' d, through battery B to earth. There is now no current in L C, but the armature A' is attracted by the magnetism imparted to the relay R' by the battery B, now flowing through the coil M C in the same direction as before around the core of the relay R'. If the coils L C and M C are equal and X is adjusted to equal the resistance of the main circuit, the battery B will, with the lever K' upraised or depressed, uniformly magnetize R' and attract the armature A'. If we adjust the spring S above the attraction imparted by the battery B, the lever K' may be manipulated without visibly affecting the relay, while the strength of currents transmitted from the distant end of the line will (if the batteries are arranged with + at one end and − at the other end of the line) combine with that of the battery B, and the armature A' will, by the increased attraction in the relay R', respond to them.

In practice the relay R' is better wound with four coils. L C is then represented by two coils, one upon each half of the core, and M C is likewise represented by two coils, one upon each half of the core. The coils L C may be composed of a wire whose length and resistance are equal to M C, or they may be composed of a shorter wire of lower resistance. When the latter is employed, we obtain a uniform effect from the battery B, with the lever K' upraised or depressed, by lowering the resistance in X proportionately to compensate for the lesser magnetic power of the shorter coils. The effects of the return and extra currents are in this arrangement neutralized by the means explained in connection with Fig. 1.

We claim as our invention—

1. In a multiplex telegraph, a main and a local circuit extending, respectively, through different coils of a relay or receiving instrument, a signaling-battery, and means, substantially as described, for completely transferring said battery first through one of said coils and then through the other.

2. In a multiplex telegraph, the combination of two receiving-relays, a main and local circuit extending, respectively, through different coils of said relays, a main-line battery in sections, a local battery in a closed circuit passing through both relays, and means, substantially as described, for transferring a part or all of said main-line battery into the first-named local and main-line circuits at will, substantially as described.

3. In a multiplex telegraph, the local neutralizing-battery L B, arranged in circuit through both receiving-relays R' R², and an adjustable shunt-resistant, R$h$, connected in circuit therewith, substantially as described.

4. In a multiplex telegraph, the combination of three transmitters and two keys with three electro-magnets and three batteries, two of which normally aid each other and are opposed by the third, whereby the transmitters are normally undisturbed and each is actuated by its own key, while all three are actuated when both keys are operated simultaneously, substantially as described.

5. In a multiplex telegraph-receiver, a main-line relay and two local relays under control of said main-line relay, the first of which local relays controls a local sounder, in combination with connections, substantially as described, whereby a maximum or a minimum current causes the local sounder to act, while an intermediate current causes the second of said local relays to continuously make and break a circuit through the first-named local relay, so that the sounder will not act, all substantially as described.

6. In a multiplex telegraph, a device for overcoming statical troubles, consisting of an induction-coil whose primary is located in a local circuit, with its secondary in the main or signaling circuit, in combination with a main or signaling battery, and means, substantially as described, for connecting said signaling-battery first to one circuit and then to the other, substantially as described.

7. In a device for overcoming statical troubles in multiplex telegraphy, an induction-coil consisting of the usual primary coil located in the branch line and secondary coil located in the main-line circuit, and means for interchanging said coils—that is, for making each coil successively a primary and a secondary to the other—substantially as described.

DAVID HERBERT KEELEY.
A. A. E. GARVEY.

Witnesses:
T. AHEARN,
C. M. GARVEY.